United States Patent
Behnia et al.

(10) Patent No.: US 10,767,557 B1
(45) Date of Patent: Sep. 8, 2020

(54) GAS-ASSISTED AIR TURBINE SYSTEM FOR GENERATING ELECTRICITY

(71) Applicant: Ladan Behnia, Beverly Hills, CA (US)

(72) Inventors: Ladan Behnia, Beverly Hills, CA (US); Alireza Yazdanshenas, San Juan Capistrano, CA (US)

(73) Assignee: Ladan Behnia, Beverly Hills, CA (US)

( * ) Notice: Subject to any disclaimer, the term of this patent is extended or adjusted under 35 U.S.C. 154(b) by 228 days.

(21) Appl. No.: 15/917,155

(22) Filed: Mar. 9, 2018

Related U.S. Application Data (60) Provisional application No. 62/469,608, filed on Mar. 10, 2017.

(51) Int. Cl.
| | |
|---|---|
| *F02C 6/16* | (2006.01) |
| *F02C 6/14* | (2006.01) |
| *F02C 1/02* | (2006.01) |
| *F01D 15/10* | (2006.01) |

(52) U.S. Cl.
CPC ............... *F02C 6/16* (2013.01); *F01D 15/10* (2013.01); *F02C 1/02* (2013.01); *F02C 6/14* (2013.01); *F05D 2210/12* (2013.01); *F05D 2220/76* (2013.01); *F05D 2260/42* (2013.01); *F05D 2270/301* (2013.01)

(58) Field of Classification Search
CPC ..................................... F02C 6/14; F02C 6/16
See application file for complete search history.

(56) References Cited

U.S. PATENT DOCUMENTS

| | | |
|---|---|---|
| 1,771,200 A | 7/1930 | Akers |
| 3,631,673 A | 1/1972 | Charrier et al. |
| 3,643,426 A | 2/1972 | Janelid |
| 3,677,008 A | 7/1972 | Koutz |
| 3,831,373 A | 8/1974 | Flynt |
| 3,866,058 A | 2/1975 | Lenssen |
| 3,885,163 A | 5/1975 | Toberman |
| 3,939,356 A | 2/1976 | Loane |
| 3,988,897 A | 11/1976 | Strub |
| 4,081,224 A | 3/1978 | Krupp |
| 4,100,745 A | 7/1978 | Gyarmathy et al. |
| 4,117,343 A | 9/1978 | Hoffeins |
| 4,147,204 A | 4/1979 | Pfenninger |
| 4,150,547 A | 4/1979 | Hobson |
| 4,158,145 A | 6/1979 | Kartsounes et al. |
| 4,173,431 A | 11/1979 | Smith |
| 4,237,692 A | 12/1980 | Ahrens et al. |
| 4,281,256 A | 7/1981 | Ahrens et al. |
| 4,312,179 A | 1/1982 | Zaugg |
| 4,353,214 A | 10/1982 | Gardner |

(Continued)

*Primary Examiner* — Scott J Walthour
(74) *Attorney, Agent, or Firm* — Makoui Law, PC; Ali Makoui (57) ABSTRACT

A system for generating electricity comprising a turbine and a generator coupled to the turbine by a generator shaft so that an armature of the generator rotates when the turbine blades of the turbine are rotating, wherein rotation of the armature produces electricity. The system comprising a reservoir and a pressure sensor capable of providing a stream of signals corresponding to the pressure in the reservoir. The system selectively operating in one of a first operating mode, a second operating mode, a third operating mode, and a fourth operating mode. The mode of operation being selected based on a determination of the pressure in the reservoir.

18 Claims, 6 Drawing Sheets

(56) References Cited

U.S. PATENT DOCUMENTS

| | | |
|---|---|---|
| 4,409,489 A | 10/1983 | Hayes |
| 4,418,542 A | 12/1983 | Ferrell |
| 4,523,432 A | 6/1985 | Frutschi |
| 4,593,202 A | 6/1986 | Dickinson |
| 4,686,822 A | 8/1987 | Frutschi |
| 4,765,142 A | 8/1988 | Nakhamkin |
| 4,819,423 A | 4/1989 | Vershure, Jr. et al. |
| 4,849,648 A | 7/1989 | Longardner |
| 4,916,893 A | 4/1990 | Rodgers |
| 5,363,642 A | 11/1994 | Frutschi et al. |
| 5,448,889 A | 9/1995 | Bronicki |
| 5,491,969 A | 2/1996 | Cohn et al. |
| 5,537,822 A | 7/1996 | Shnaid et al. |
| 5,634,340 A | 6/1997 | Grennan |
| 5,845,479 A | 12/1998 | Nakhamkin et al. |
| 6,091,159 A | 7/2000 | Galich |
| 6,172,426 B1 | 1/2001 | Galich |
| 6,182,378 B1 | 2/2001 | Sendaula |
| 6,376,925 B1 | 4/2002 | Galich |
| 6,718,760 B1 | 4/2004 | Padera |
| 6,745,569 B2 | 6/2004 | Gerdes |
| 6,949,840 B2 | 9/2005 | Ricketts |
| 7,086,231 B2 | 8/2006 | Pinkerton |
| 7,325,401 B1 * | 2/2008 | Kesseli ............... F01D 17/143 60/677 |
| 7,406,828 B1 | 8/2008 | Nakhamkin |
| 7,669,423 B2 | 3/2010 | Nakhamkin |
| 7,956,476 B2 | 6/2011 | Yang |
| 8,253,281 B2 | 8/2012 | Namuduri et al. |
| 8,278,800 B2 | 10/2012 | Abramovich et al. |
| 8,341,964 B2 | 1/2013 | Finkenrath et al. |
| 8,572,972 B2 | 11/2013 | Frey et al. |
| 9,140,193 B2 | 9/2015 | Sutcu et al. |
| 9,157,421 B2 | 10/2015 | Behnia et al. |
| 9,249,728 B2 | 2/2016 | Lim et al. |
| 9,322,296 B2 | 4/2016 | Hugo et al. |
| 9,464,575 B2 | 10/2016 | Juchauld et al. |
| 9,739,204 B2 | 8/2017 | Bird |
| 9,784,186 B2 | 10/2017 | Bunel et al. |
| 9,803,554 B2 | 10/2017 | Martinez Fabre et al. |
| 2013/0001948 A1 * | 1/2013 | Lim ..................... F02C 6/16 290/52 |

* cited by examiner

| | AIR SUPPLIED TO TURBINE FROM RESERVIOR | AIR SUPPLIED TO TURBINE FROM COMPRESSOR | FUEL BURNED IN COMBUSTION CHAMBER? |
|---|---|---|---|
| FIRST OPERATING MODE | ALL | NONE | NO |
| SECOND OPERATING MODE | ALL | NONE | YES |
| THIRD OPERATING MODE | SOME | SOME | YES |
| FOURTH OPERATING MODE | NONE | ALL | YES |

| | CLUTCH | COMPRESSOR FEED VALVES | RESERVIOR FEED VALVES | FUEL VALVE |
|---|---|---|---|---|
| FIRST OPERATING MODE | DISENGAGED | CLOSED | OPEN | CLOSED |
| SECOND OPERATING MODE | DISENGAGED | CLOSED | OPEN | OPEN |
| THIRD OPERATING MODE | ENGAGED | OPEN | OPEN | OPEN |
| FOURTH OPERATING MODE | ENGAGED | OPEN | CLOSED | OPEN |

FIG. 3

| RESERVOIR PRESSURE [PSI] | |
|---|---|
| GREATER THAN 40 | FIRST OPERATING MODE |
| BETWEEN 40 AND 28 | SECOND OPERATING MODE |
| BETWEEN 28 AND 25 | THIRD OPERATING MODE |
| LESS THAN 25 | FOURTH OPERATING MODE |

GAS-ASSISTED AIR TURBINE SYSTEM FOR GENERATING ELECTRICITY

CROSS-REFERENCE TO RELATED APPLICATION

This application claims the benefit of U.S. Provisional Application No. 62/469,608, filed Mar. 10, 2017, the disclosure of which is incorporated by reference herein.

FIELD OF THE INVENTION

The present invention relates to the structure and operation of turbine systems for generating electricity.

BACKGROUND OF THE DISCLOSURE

The supply of traditional fossil fuels such as petroleum, natural gas and coal is finite. As these traditional fossil fuels and other hydrocarbon-based energy sources become more scarce and, in turn, more costly, alternative energy sources become more attractive. However, generally because of cost and complexity concerns, many alternative energy ideas have yet to be implemented. Often, cities and municipalities, the very institutions struggling the most with energy costs, are in the best position to create and harness alternative energy. It would be desirable to provide cities and municipalities with tools to meet these challenges, such as methods for storing energy generated at one time for use at another time.

SUMMARY

A system for generating electricity comprises a turbine including turbine blades. The turbine is configured so that the turbine blades rotate when working fluid is flowing through the turbine. A generator is coupled to the turbine by a generator shaft so that an armature of the generator rotates when the turbine blades of the turbine are rotating. The generator is configured so that rotation of the armature produces electricity.

The system also includes a compressor and a reservoir for selectively providing compressed air to the turbine. The reservoir fluidly communicates with the turbine via a combustion chamber and via a plurality of reservoir feed valves. The compressor is selectively coupled to the turbine by a compressor drive assembly. The compressor drive assembly includes a first drive shaft, a second drive shaft, and a clutch coupled between the first drive shaft and the second drive shaft. An outlet of the compressor is fluidly coupled to the turbine by a plurality of compressor feed valves. The system also includes a fuel valve coupled between the combustion chamber and a supply of fuel gas.

In an embodiment, the system is capable of selectively operating in one of a first operating mode, a second operating mode, a third operating mode, and a fourth operating mode. The working fluid flowing through the turbine comprises compressed air provided by the reservoir and no fuel gas is burned in the combustion chamber while the system is operating in the first operating mode. The working fluid flowing through the turbine comprises compressed air provided by the reservoir and combustion product produced by burning fuel gas in the combustion chamber while the system is operating in the second operating mode. The working fluid flowing through the turbine comprises compressed air provided by the reservoir, compressed air provided by the compressor, and combustion product produced by burning fuel gas in the combustion chamber while the system is operating in the third operating mode. The working fluid flowing through the turbine comprises compressed air provided by the compressor and combustion product produced by burning fuel gas in the combustion chamber while the system is operating in the fourth operating mode.

In an embodiment, the system is operated in the first operating mode while a pressure of the compressed air in the reservoir is greater than or equal to 40 psi, the system is operated in the second operating mode while a pressure of the compressed air in the reservoir is less than 40 psi and greater than or equal to 28 psi, the system is operated in the third operating mode while a pressure of the compressed air in the reservoir is less than 28 psi and greater than or equal to 25 psi, and the system is operated in the fourth operating mode while a pressure of the compressed air in the reservoir is less than 25 psi.

In an embodiment, the system is capable of selectively operating in one of a first operating mode, a second operating mode, a third operating mode, and a fourth operating mode. In this embodiment, the clutch is disengaged, the compressor feed valves are closed, the reservoir feed valves are open and the fuel valve is closed while the system is operating in the first operating mode. The clutch is disengaged, the compressor feed valves are closed, the reservoir feed valves are open and the fuel valve is open while the system is operating in the second operating mode. The clutch is engaged, the compressor feed valves are open, the reservoir feed valves are open and the fuel valve is open while the system is operating in the third operating mode. The clutch is engaged, the compressor feed valves are open, the reservoir feed valves are closed and the fuel valve is open while the system is operating in the fourth operating mode.

DETAILED DESCRIPTION

Figure 1:
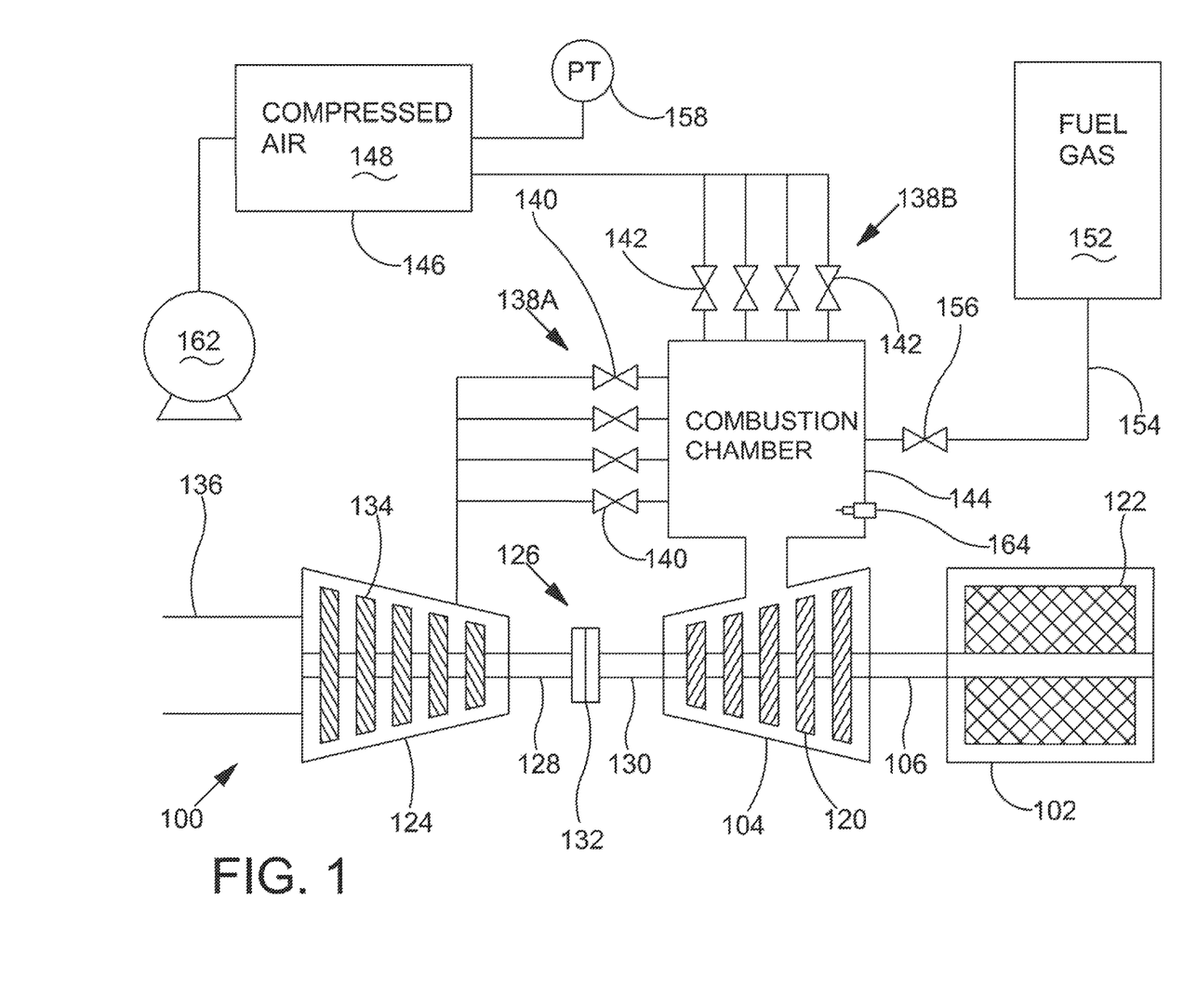
FIG. 1 is a diagram showing a system in accordance with the detailed description.

FIG. 1 is a diagram showing a system 100 in accordance with this detailed description. The system 100 includes a generator 102 that is coupled to a turbine 104 by a generator shaft 106. The generator shaft 106 is coupled between the blades 120 of the turbine 104 and an armature 122 of the generator 102 so that the armature 122 of the generator 102 rotates whenever the turbine blades 120 of the turbine 104 are rotating. The generator 102 generates electricity when the armature 122 is rotating.

A compressor 124 is selectively coupled to the turbine 104 by a compressor drive assembly 126. The compressor drive assembly 126 includes a first drive shaft 128, a second drive shaft 130 and a clutch 132 coupled between the first drive shaft 128 and the second drive shaft 130.

The compressor 124 may be selectively driven by the turbine 104 when the clutch 132 is engaged. Impellers 134 of the compressor 124 rotate when the compressor 124 is driven by the turbine 104. In operation, the compressor 124 draws ambient air through an air intake 136. The outlet of the compressor 124 fluidly communicates with the turbine 104 via a first array 138A of compressor feed valves 140. When the compressor feed valves 140 of the first array 138A are open, compressed air from the compressor 124 flows into the turbine 104 via the combustion chamber 144. Compressed air flowing through the turbine 104 causes the blades 120 of the turbine 104 to rotate. The armature 122 of the generator 102 rotates to generate electricity when the blades 120 of the turbine 104 rotate.

System 100 includes a reservoir 146 containing compressed air 148. The reservoir 146 fluidly communicates with the turbine 104 via a combustion chamber 144 and a second array 138B of reservoir feed valves 142. When the reservoir feed valves 142 of the second array 138B are open, compressed air 148 from the reservoir 146 is allowed to flow into the turbine 104. Compressed air flowing through the turbine 104 causes the blades 120 of the turbine 104 to rotate. The armature 122 of the generator 102 rotates to generate electricity when the blades 120 of the turbine 104 rotate.

Still referring to FIG. 1, it will be appreciated that the system 100 includes a pressure sensor 158 and a pumping mechanism 162 that are both fluidly connected to the reservoir 146. In the illustrated embodiment, the pressure sensor 158 and the pumping mechanism 162 fluidly communicate with the reservoir 146 via tubing, conduit, and/or pipes. In one or more embodiments, the pressure sensor 158 is capable of providing a stream of signals corresponding to a pressure in the reservoir 146. In one or more embodiments, the pumping mechanism 162 is operable to pump a gas (e.g., air) into the reservoir 146. The pumping mechanism 162 may comprise various gas pumping devices without deviating from the spirit and scope of this detailed description. Examples of gas pumping devices that may be suitable in some applications are disclosed in the following United States Patents all of which are hereby incorporated by reference herein: U.S. Pat. Nos. 9,157,421, 6,949,840, 6,718,760, 6,376,925, 6,172,426, 6,091,159, 4,418,542, 4,409,489, 4,173,431, 4,081,224, 3,885,163, and 1,771,200.

A supply of fuel gas 152 is coupled to the combustion chamber 144 by a fuel line 154 and a fuel valve 156. The fuel gas 152 flows into the combustion chamber 144 when the fuel valve 156 is open and compressed air 148 from the reservoir 146 flows into the combustion chamber 144 when the reservoir feed valves 142 of the second array 138B are open. The fuel gas 152 may be combined with the compressed air 148 and burned to form gaseous combustion product supplied to the turbine 104. Gaseous combustion product flowing through the turbine 104 causes the blades 120 of the turbine 104 to rotate. The armature 122 of the generator 102 rotates to generate electricity when the blades 120 of the turbine 104 rotate. In the example embodiment of FIG. 1, the system 100 also includes an ignition plug 164 having a distal end disposed inside the combustion chamber 144. In some useful embodiments, the ignition plug 164 capable of igniting fuel gas inside the combustion chamber 144. Examples of ignition plugs that may be suitable in some applications are disclosed in the following United States Patents all of which are hereby incorporated by reference herein: U.S. Pat. Nos. 9,803,554, 9,784,186, 9,739,204, 9,464,575 and 9,140,193.

Figure 2:
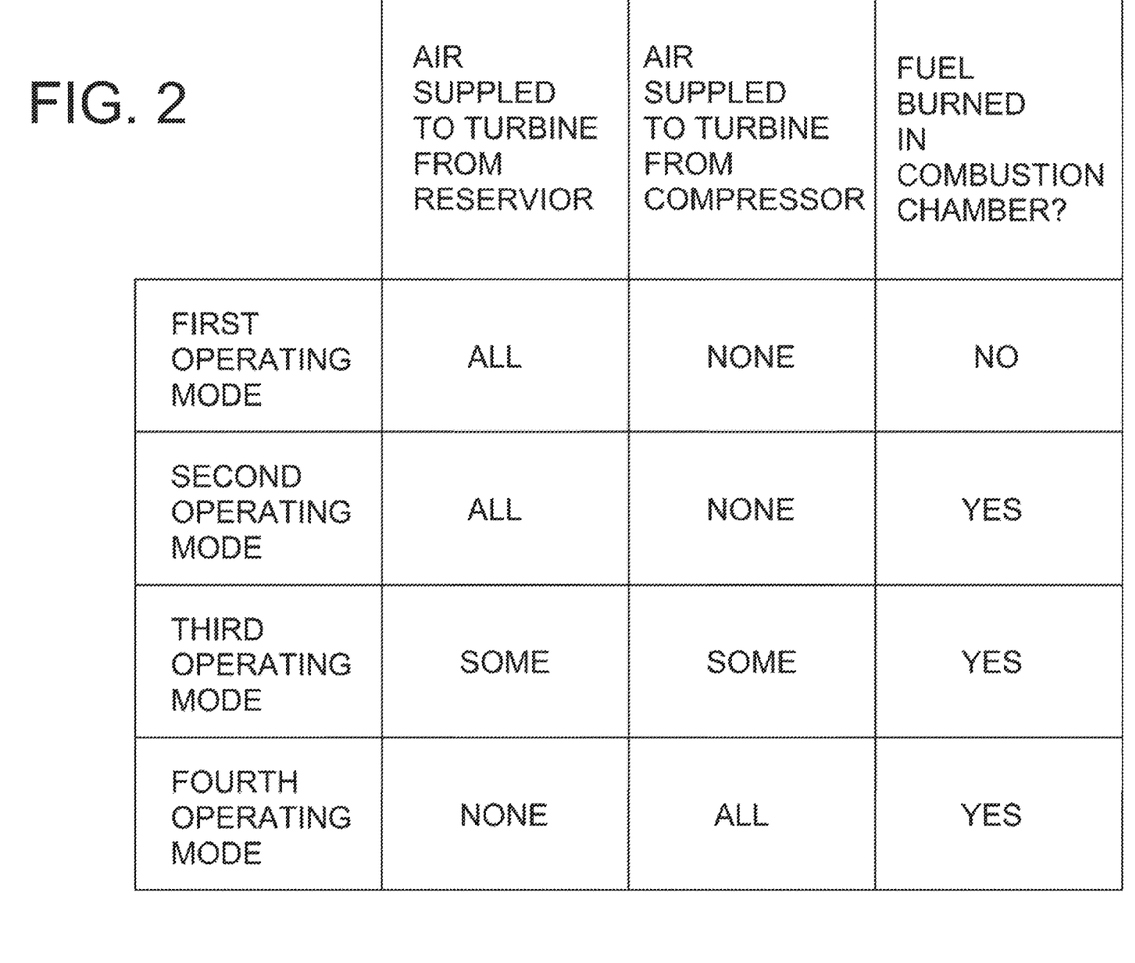
FIG. 2 is a table illustrating four operating modes of a system in accordance with the detailed description.

FIG. 2 is a table illustrating four operating modes of a system in accordance with this detailed description. As shown in the table of FIG. 2, all of the air supplied to the turbine is provided by the reservoir and no fuel gas is burned in the combustion chamber while the system is operating in the first operating mode. When the system is operating in the second operating mode, fuel is burned in the combustion chamber and all of the air supplied to the turbine is provided by the reservoir. A first portion of the air supplied to the turbine is provided by the reservoir and a second portion of the air supplied to the turbine is provided by the compressor while the system is operating in the third operating mode. Fuel gas is combined with the compressed air and burned in the combustion chamber to form gaseous combustion product that is provided to the turbine while the system is operating in the third operating mode. All of the air supplied to the turbine is provided by the compressor while the system is operating in the fourth mode. Fuel gas is combined with the compressed air from the compressor and burned in the combustion chamber to form gaseous combustion product.

Figure 3:
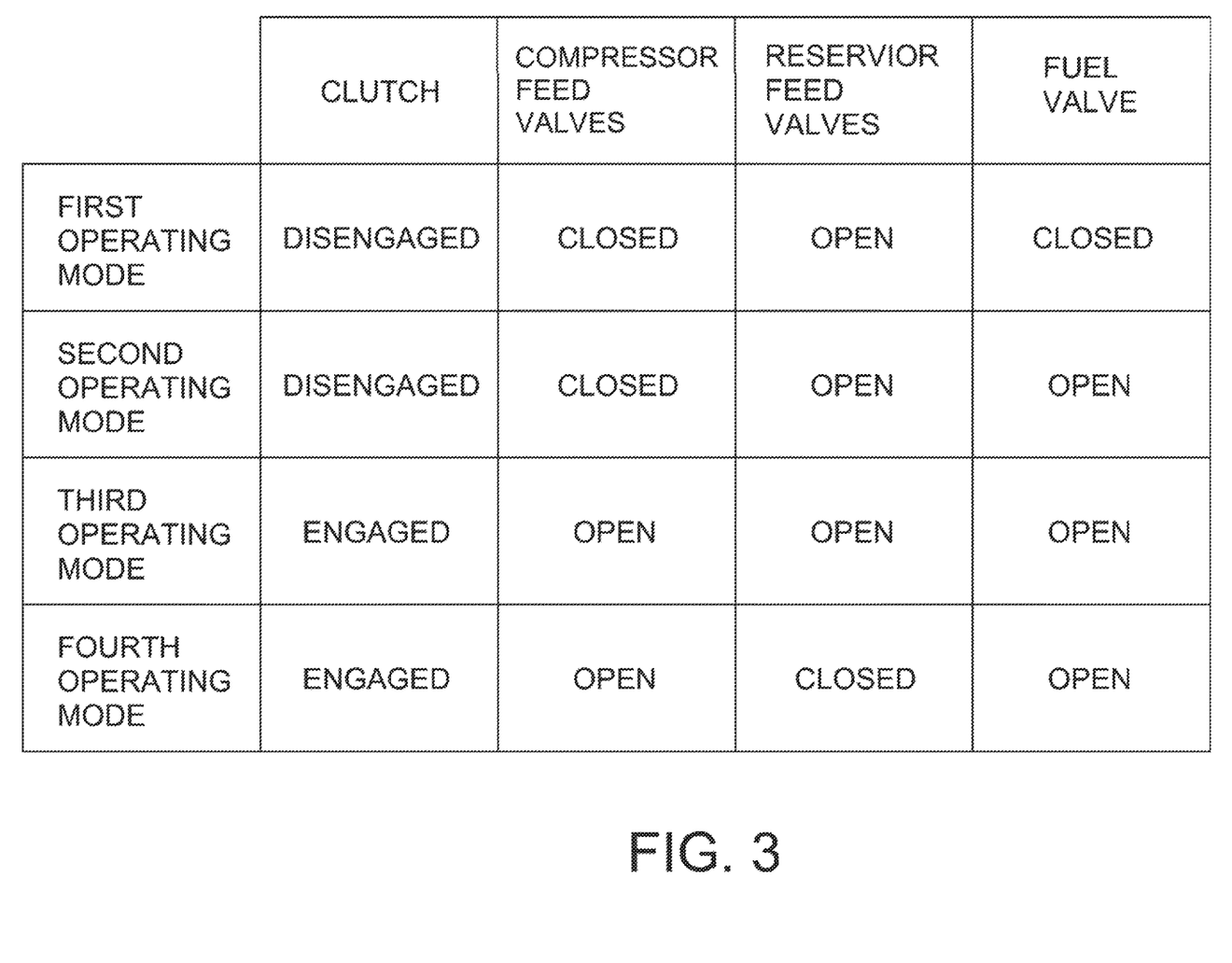
FIG. 3 is a table illustrating four operating modes of a system in accordance with the detailed description.

FIG. 3 is a table illustrating four operating modes of a system in accordance with this detailed description. The four operating modes are listed in the first column of the table. The state of the clutch (engaged or disengaged) during each operating mode is shown in the second column of the table. The third column of the table shows the state of the compressor feed valves (open or closed) for each operating mode. The fourth column of the table shows the state of the reservoir feed valves (open or closed) for each operating mode. The state of the fuel valve (open or closed) corresponding to each mode of operation is shown in the fifth column of the table.

Figure 4:
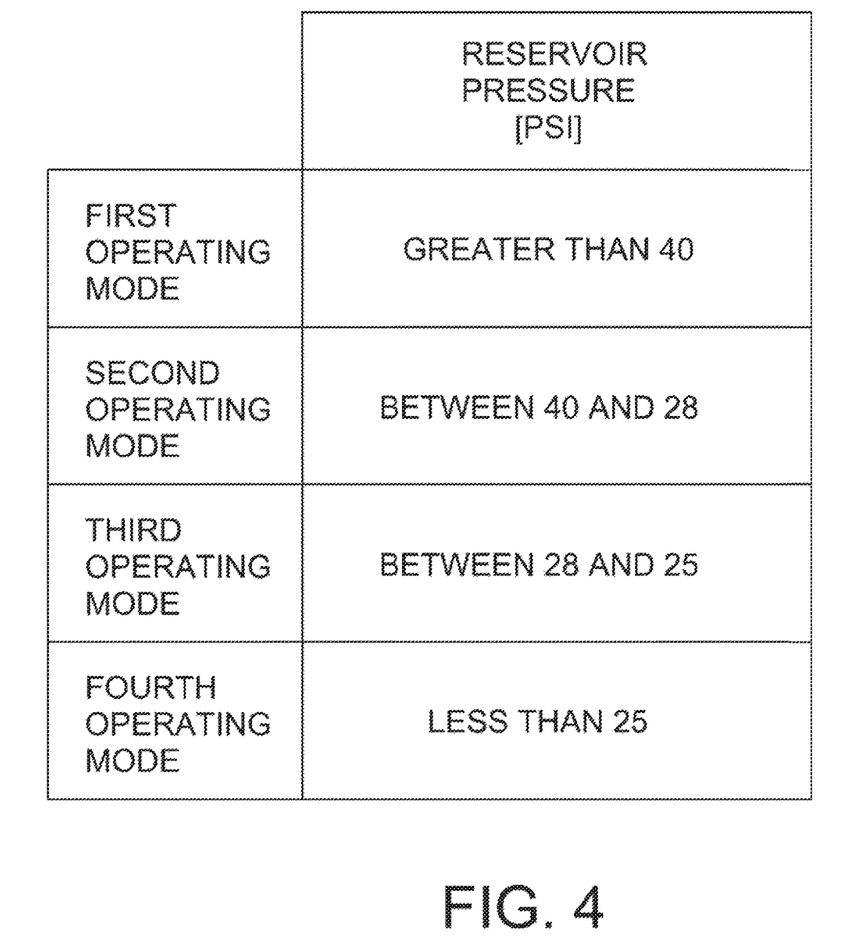
FIG. 4 is a table illustrating four operating modes of a system in accordance with the detailed description.

FIG. 4 is a table illustrating four operating modes of a system in accordance with this detailed description. In the illustrative embodiment of FIG. 4, the system is operated in the first operating mode while the pressure of the compressed air in the reservoir is greater than or equal to 40 psi. The system is operated in the second operating mode while a pressure of the compressed air in the reservoir is less than 40 psi and greater than or equal to 28 psi in the embodiment illustrated in the table of FIG. 4. The system is operated in the third operating mode while a pressure of the compressed air in the reservoir is less than 28 psi and greater than or equal to 25 psi in the embodiment of FIG. 4. Finally, the system is operated in the fourth operating mode while a pressure of the compressed air in the reservoir is less than 25 psi in the embodiment illustrated in the table of FIG. 4.

Referring to FIGS. 1-4, a system for generating electricity comprises a turbine 104 including turbine blades 120. The turbine 104 is configured so that the turbine blades 120 rotate when working fluid is flowing through the turbine 104. A generator 102 is coupled to the turbine 104 by a generator shaft so that an armature 122 of the generator 102 rotates when the turbine blades 120 of the turbine 104 are rotating. The generator 102 is configured so that rotation of the armature 122 produces electricity.

The system also includes a compressor 124 and a reservoir 146 for selectively providing compressed air to the turbine 104. The reservoir 146 fluidly communicates with the turbine 104 via a combustion chamber 144 and a plurality of reservoir feed valves 142. The compressor 124 is selectively coupled to the turbine 104 by a compressor drive assembly 126. The compressor drive assembly 126 includes a first drive shaft 128, a second drive shaft 130, and a clutch 132 coupled between the first drive shaft 128 and the second drive shaft 130. An outlet of the compressor 124 is fluidly coupled to the turbine 104 by a plurality of compressor feed valves 140. The system also includes a fuel valve 156 coupled between the combustion chamber 144 and a supply 150 of fuel gas.

In an embodiment, the system is capable of selectively operating in one of a first operating mode, a second operating mode, a third operating mode, and a fourth operating mode. In this embodiment, the clutch 132 is disengaged, the compressor feed valves 140 are closed, the reservoir feed valves 142 are open and the fuel valve 156 is closed while the system is operating in the first operating mode. The clutch 132 is disengaged, the compressor feed valves 140 are closed, the reservoir feed valves 142 are open and the fuel valve 156 is open while the system is operating in the second operating mode. The clutch 132 is engaged, the compressor feed valves 140 are open, the reservoir feed valves 142 are open and the fuel valve 156 is open while the system is operating in the third operating mode. The clutch 132 is engaged, the compressor feed valves 140 are open, the reservoir feed valves 142 are closed and the fuel valve 156 is open while the system is operating in the fourth operating mode.

In an embodiment, the system is operated in the first operating mode while a pressure of the compressed air in the reservoir is greater than or equal to 40 psi, the system is operated in the second operating mode while a pressure of the compressed air in the reservoir is less than 40 psi and greater than or equal to 28 psi, the system is operated in the third operating mode while a pressure of the compressed air in the reservoir is less than 28 psi and greater than or equal to 25 psi, and the system is operated in the fourth operating mode while a pressure of the compressed air in the reservoir is less than 25 psi.

In an embodiment, the system is capable of selectively operating in one of a first operating mode, a second operating mode, a third operating mode, and a fourth operating mode. The working fluid flowing through the turbine 104 comprises compressed air provided by the reservoir 146 and no fuel gas is burned in the combustion chamber 144 while the system is operating in the first operating mode. The working fluid flowing through the turbine 104 comprises compressed air provided by the reservoir 146 and combustion product produced by burning fuel gas in the combustion chamber 144 while the system is operating in the second operating mode. The working fluid flowing through the turbine 104 comprises compressed air provided by the reservoir 146, compressed air provided by the compressor 124, and combustion product produced by burning fuel gas in the combustion chamber 144 while the system is operating in the third operating mode. The working fluid flowing through the turbine 104 comprises compressed air provided by the compressor 124 and combustion product produced by burning fuel gas in the combustion chamber 144 while the system is operating in the fourth operating mode.

Figure 5:
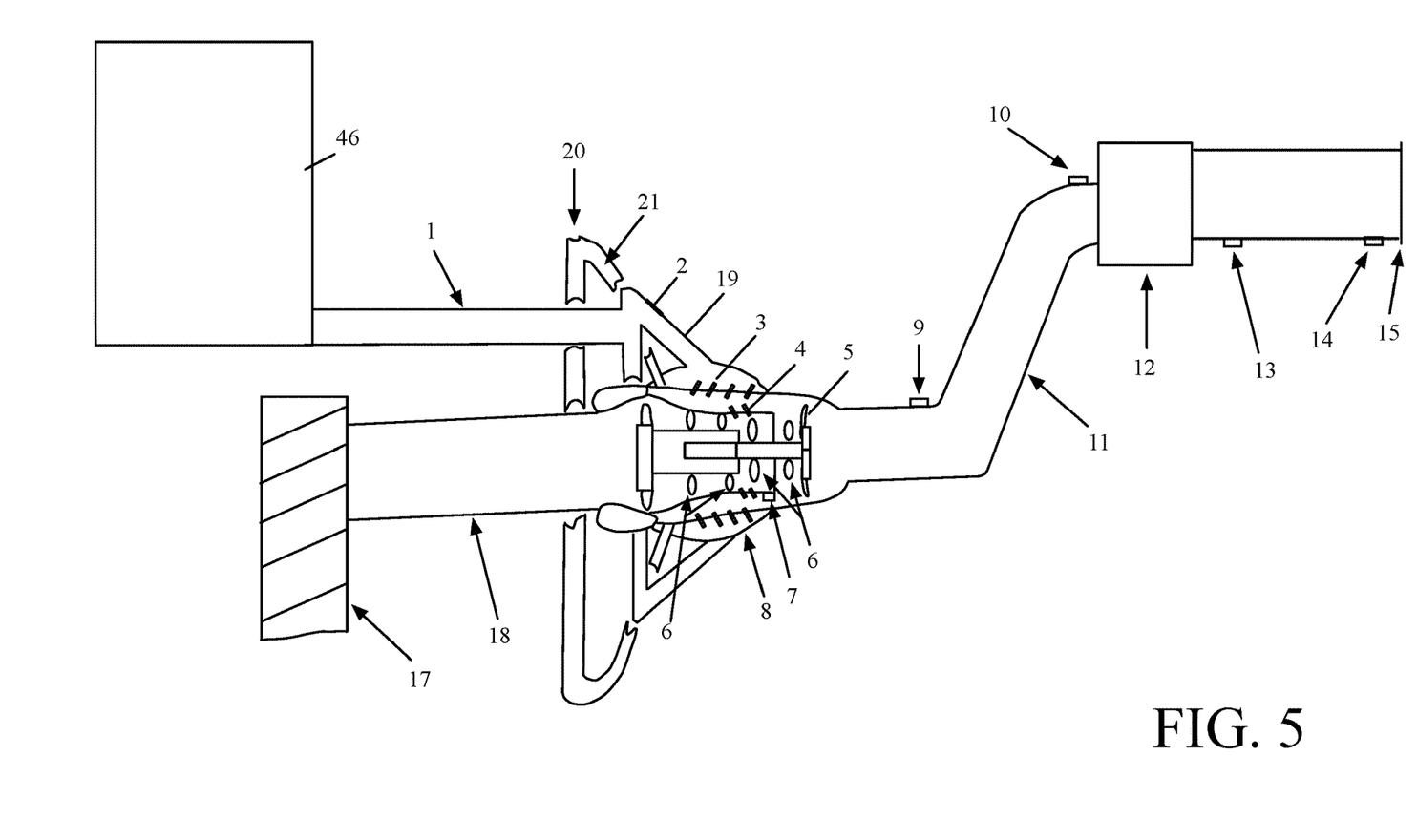
FIG. 5 is a diagram showing a system in accordance with the detailed description.

FIG. 5 is a diagram showing a system 200 in accordance with this detailed description. The system of FIG. 5 includes tubing 1 that is connected to a tank 46. The tank 46 contains a supply of compressed air. Tubing 1 leads from the tank 46 to an air ring 2 for an air feeder. A plurality of air actuator valves 3 provide a path from the tank 46 to a combustion chamber. In an embodiment, the air actuator valves 3 are open 100% once the tank pressure is over 40 PSI, and will be fully closed when the tank reach to 28 PSI. A plurality of air actuator valves 6 are provided to open air from a turbine driven compressor to the combustion chamber. In an embodiment, the air actuator valves 6 are fully closed when the tank pressure is over 40 PSI and will be fully open when the tank pressure is 28 PSI.

The system of FIG. 5 includes a compressor and a turbine. The turbine comprising turbine blades 5. A plurality of bearings 6 are provided for supporting turbine shaft and compressor shaft. An ignition plug and a plurality of temperature sensors are located around the combustion chamber. The location for the ignition plug and the temperature sensors is labeled with number 7 in FIG. 5. Air feeder to the combustion chamber from the air tank 46 is labeled with number 8 in FIG. 5.

Still referring to FIG. 5, air entering the compressor passes through an acoustical louver 17 and an air intake 18. Gas flows through a gas feed line 19 and a gas ring 21. A security one way gas valve 22 is provided to eliminate return of the combusted mix. Working fluid exiting the turbine passes through an exhaust pipe 11 and a silencer 14. An oxygen sensor 9 is located at the exhaust of the turbine. A temperature sensor 10 is located just prior to a catalyst 12. A temperature sensor 13 is located just after catalyst. An oxygen sensor 15 is located at the exhaust tip.

Figure 6:
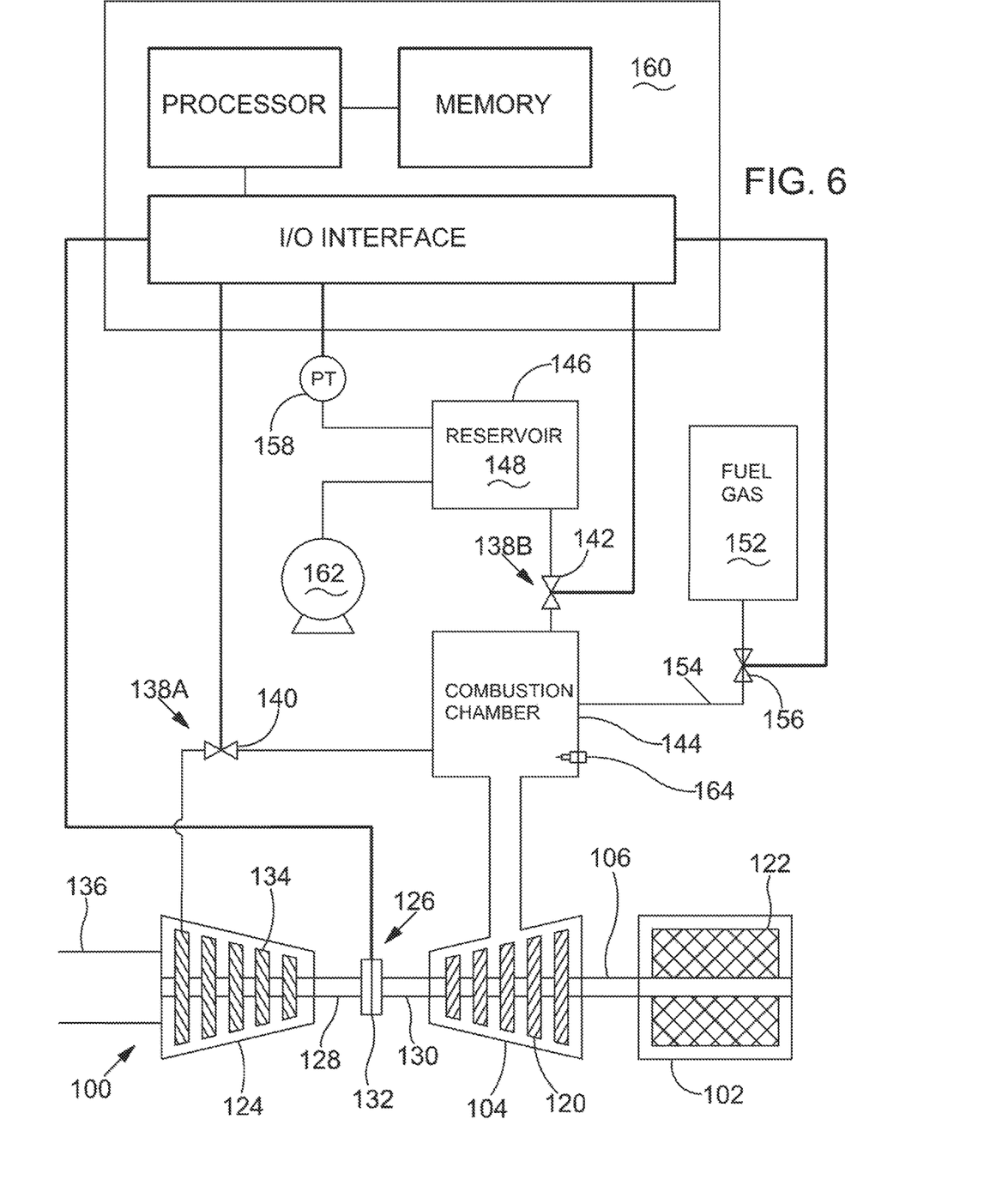
FIG. 6 is a diagram showing a system in accordance with the detailed description.

FIG. 6 is a diagram showing a system in accordance with this detailed description. With reference to FIG. 6, it will be appreciated that the system 100 comprises circuitry 160 that is operatively coupled to a pressure sensor 158, a clutch 132, one or more compressor feed valves 140, one or more reservoir feed valves 142, and a fuel valve 156. (Due to space constraints, only a single compressor feed valve 140 and a single reservoir feed valve 142 are shown in FIG. 6.) The circuitry 160 may comprise various elements without deviating from the spirit and scope of the present invention. For example, the circuitry may comprise combinational logic, a plurality of state machines and a clock that provides a clock signal to the combinational logic and the plurality of state machines. Each state machine may comprise state logic circuitry and a state memory. The state memory may comprise a plurality of memory elements such as flip-flops. The state logic circuitry of the state machine determines the conditions for changing the logical values of bits stored in the state memory. More particularly, the state logic circuitry of the state machine logically combines the binary values of a plurality of inputs with the binary values in the state memory representing the current state to generate a binary number representing the next state. The combinational logic circuitry may comprise various elements without deviating from the spirit and scope of the present description. For example, the combinational logic circuitry may comprise a plurality of discrete electronic components. Examples of electronic components that may be suitable in some applications include logic gates. Examples of logic gates include, AND gates, NAND gates, OR gates, XOR gates, NOR gates, NOT gates, and the like. These logic gates may comprise a plurality of transistors (e.g., transistor-transistor logic (TTL)). By way of a second example, combinational logic circuitry and the state machine may comprise a plurality of electronic components in the form of an application specific integrated circuit (ASIC). By way of a third example, combinational logic circuitry and the state machines may be implemented in field-programmable gate array (FPGA).

Still referring to FIG. 6, the circuitry 160 may, as mentioned above, comprise various control elements without deviating from the spirit and scope of the present invention. In one or more embodiments, for example, the circuitry 160 may comprise a processor, a memory, an input/output interface, a display, and a bus that communicatively couples the processor to the memory, the display and the input/output interface. In an embodiment, the processor may comprise a collection of one or more logical cores or units for receiving and executing instructions or programs. For example, in one or more embodiments, the processor may be configured to receive and execute various routines, programs, objects, components, logic, data structures, and so on to perform particular tasks. In an embodiment, the memory is a collection of various computer-readable media in the system architecture. In various embodiments, memory can include, but is not limited to volatile media, non-volatile media, removable media, and non-removable media. For example, in one or more embodiments, the memory can include random access memory (RAM), cache memory, read only memory (ROM), flash memory, solid state memory, or other suitable type of memory. In one or more embodiments, the memory includes media that is accessible to the electronic circuitry 160. For example, in some embodiments, the memory includes computer readable media located locally in the circuitry 160 and/or media located remotely to the circuitry 160 and accessible via a network. In some embodiments, the memory includes a program product having a group of one or more logical instructions that are executable by the processor to carry out the functions of the various embodiments of the disclosure. In an embodiment, the bus comprises one or more of any of suitable type of bus structures for communicatively connecting the electronic elements. In various embodiments the bus may include a memory bus or memory controller, a peripheral bus, and a processor or local bus using any of a variety of bus architectures. In some embodiments, the circuitry 160 includes an I/O interface coupled to a processor. The I/O interface may facilitate communication between the various components of the system 100. In certain embodiments the I/O interface facilitates communication with input and output devices for interacting with a user. For example, the I/O interface may communicate with one or more devices such, as a user-input device and/or a visual display, which enable a user to interact directly with the circuitry 160. The user-input device may comprise a keyboard, one or more push buttons, a touch screen, or other devices that allows a user to input information. The visual display may comprise any of a variety of visual displays, such as a viewable screen, a set of viewable symbols or numbers, and so on.

The system 100 of FIG. 6 further includes a generator 102 that is coupled to a turbine 104 by a generator shaft 106. The generator shaft 106 is coupled between the blades 120 of the turbine 104 and an armature 122 of the generator 102 so that the armature 122 of the generator 102 rotates whenever the turbine blades 120 of the turbine 104 are rotating. The generator 102 generates electricity when the armature 122 is rotating. A compressor 124 is selectively coupled to the turbine 104 by a compressor drive assembly 126. The compressor drive assembly 126 includes a first drive shaft 128, a second drive shaft 130 and a clutch 132 coupled between the first drive shaft 128 and the second drive shaft 130.

The compressor 124 may be selectively driven by the turbine 104 when the clutch 132 is engaged. Impellers 134 of the compressor 124 rotate when the compressor 124 is driven by the turbine 104. In operation, the compressor 124 draws ambient air through an air intake 136. The outlet of the compressor 124 fluidly communicates with the turbine 104 via a first array 138A of compressor feed valves 140. When the compressor feed valves 140 of the first array 138A are open, compressed air from the compressor 124 flows into the turbine 104 via the combustion chamber 144. Compressed air flowing through the turbine 104 causes the blades 120 of the turbine 104 to rotate. The armature 122 of the generator 102 rotates to generate electricity when the blades 120 of the turbine 104 rotate.

System 100 includes a reservoir 146 containing compressed air 148. The reservoir 146 fluidly communicates with the turbine 104 via a combustion chamber 144 and a second array 138B of reservoir feed valves 142. When the reservoir feed valves 142 of the second array 138B are open, compressed air 148 from the reservoir 146 is allowed to flow into the turbine 104. Compressed air flowing through the turbine 104 causes the blades 120 of the turbine 104 to rotate. The armature 122 of the generator 102 rotates to generate electricity when the blades 120 of the turbine 104 rotate.

Still referring to FIG. 6, it will be appreciated that the system 100 includes a pressure sensor 158 and a pumping mechanism 162 that are both fluidly connected to the reservoir 146. In the illustrated embodiment, the pressure sensor 158 and the pumping mechanism 162 fluidly communicate with the reservoir 146 via tubing, conduit, and/or pipes. In one or more embodiments, the pressure sensor 158 is capable of providing a stream of signals corresponding to a pressure in the reservoir 146. In one or more embodiments, the pumping mechanism 162 is operable to pump a gas (e.g., air) into the reservoir 146.

A supply of fuel gas 152 is coupled to the combustion chamber 144 by a fuel line 154 and a fuel valve 156. The fuel gas 152 flows into the combustion chamber 144 when the fuel valve 156 is open and compressed air 148 from the reservoir 146 flows into the combustion chamber 144 when the reservoir feed valves 142 of the second array 138B are open. The fuel gas 152 may be combined with the compressed air 148 and burned to form gaseous combustion product supplied to the turbine 104. Gaseous combustion product flowing through the turbine 104 causes the blades 120 of the turbine 104 to rotate. The armature 122 of the generator 102 rotates to generate electricity when the blades 120 of the turbine 104 rotate.

An example method of generating electricity comprises providing a system as described in this detailed description; determining the pressure of the compressed air in the reservoir based on the stream of signals from the pressure sensor; disengaging the clutch, closing the compressor feed valves, opening the reservoir feed valves and closing the fuel valve while the pressure of the compressed air in the reservoir is greater than or equal to a first pressure value; disengaging the clutch, closing the compressor feed valves, opening the reservoir feed valves and opening the fuel valve while the pressure of the compressed air in the reservoir is less than the first pressure value and greater than or equal to a second pressure value; engaging the clutch, opening the compressor feed valves, opening the reservoir feed valves and opening the fuel valve while the pressure of the compressed air in the reservoir is less than the second pressure value and greater than or equal to a third pressure value; and engaging the clutch, opening the compressor feed valves, closing the reservoir feed valves and opening the fuel valve while the pressure of the compressed air in the reservoir is less than the third pressure value. In some useful methods/embodiments, the first pressure value is about 40 psi, the second pressure value is about 28 psi and the third pressure value is about 25 psi. In some useful methods/embodiments, the first pressure value is greater than 39 psi and less than 41 psi, the second pressure value is greater than 27 psi and less than 29 psi, and the third pressure value is greater than 24 psi and less than 26 psi.

An example system for generating electricity comprises a turbine comprising turbine blades, the turbine being configured so that the turbine blades rotate when working fluid is flowing through the turbine; a generator coupled to the turbine by a generator shaft so that an armature of the generator rotates when the turbine blades of the turbine are rotating, wherein rotation of the armature produces electricity; a compressor selectively coupled to the turbine by a compressor drive assembly, the compressor drive assembly comprising a first drive shaft, a second drive shaft, and a clutch coupled between the first drive shaft and the second drive shaft, an outlet of the compressor being fluidly coupled to the turbine by a plurality of compressor feed valves; a reservoir containing compressed air, the reservoir fluidly communicating with the turbine via a combustion chamber and a plurality of reservoir feed valves; a pressure sensor capable of providing a stream of signals corresponding to a pressure in the reservoir, the pressure sensor being dispose disposed in fluid communication with the reservoir; a fuel valve coupled between the combustion chamber and a supply of fuel gas. In embodiment, the system selectively operates in one of a first operating mode, a second operating mode, a third operating mode, and a fourth operating mode, wherein: the clutch is disengaged, the compressor feed valves are closed, the reservoir feed valves are open and the fuel valve is closed while the system is operating in the first operating mode; the clutch is disengaged, the compressor feed valves are closed, the reservoir feed valves are open and the fuel valve is open while the system is operating in the second operating mode; the clutch is engaged, the compressor feed valves are open, the reservoir feed valves are open and the fuel valve is open while the system is operating in the third operating mode; and the clutch is engaged, the compressor feed valves are open, the reservoir feed valves are closed and the fuel valve is open while the system is operating in the fourth operating mode. In embodiments, the system also includes circuitry operatively coupled to the pressure sensor, the clutch, the compressor feed valves, the reservoir feed valves, and the fuel valve, wherein the circuitry comprises one or more processors and a non-transitory computer readable medium storing one or more instruction sets, wherein the one or more instruction sets include instructions configured to be executed by the one or more processors to cause the system: determine the pressure of the compressed air in the reservoir based on the stream of signals from the pressure sensor; disengage the clutch, close the compressor feed valves, open the reservoir feed valves and close the fuel valve while the pressure of the compressed air in the reservoir is greater than or equal to a first pressure value; disengage the clutch, close the compressor feed valves, open the reservoir feed valves and open the fuel valve while the pressure of the compressed air in the reservoir is less than the first pressure value and greater than or equal to a second pressure value; engage the clutch, open the compressor feed valves, open the reservoir feed valves and open the fuel valve while the pressure of the compressed air in the reservoir is less than the second pressure value and greater than or equal to a third pressure value; engage the clutch, open the compressor feed valves, close the reservoir feed valves and open the fuel valve while the pressure of the compressed air in the reservoir is less than the third pressure value. In embodiments, the first pressure value is greater than the second pressure value and the second pressure value is greater than the third pressure value. In embodiments, the first pressure value is about 40 psi, the second pressure value is about 28 psi and the third pressure value is about 25 psi. In embodiments, the first pressure value is greater than 39 psi and less than 41 psi, the second pressure value is greater than 27 psi and less than 29 psi, and the third pressure value is greater than 24 psi and less than 26 psi.

An example system for generating electricity comprises a turbine comprising a plurality of turbine blades, the turbine being configured so that the turbine blades rotate when working fluid is flowing through the turbine; a generator coupled to the turbine by a generator shaft so that an armature of the generator rotates when the turbine blades of the turbine are rotating, wherein rotation of the armature produces electricity; a compressor selectively coupled to the turbine by a compressor drive assembly, the compressor drive assembly comprising a first drive shaft, a second drive shaft, and a clutch coupled between the first drive shaft and the second drive shaft, an outlet of the compressor being fluidly coupled to the turbine by a plurality of compressor feed valves; a reservoir containing compressed air, the reservoir fluidly communicating with the turbine via a combustion chamber and a plurality of reservoir feed valves; a pressure sensor capable of providing a stream of signals corresponding to a pressure in the reservoir, the pressure sensor being dispose disposed in fluid communication with the reservoir; and a fuel valve coupled between the combustion chamber and a supply of fuel gas. In embodiments, the system selectively operates in one of a first operating mode, a second operating mode, a third operating mode, and a fourth operating mode, wherein: the working fluid flowing through the turbine comprises compressed air provided by the reservoir and no fuel gas is burned in the combustion chamber while the system is operating in the first operating mode; the working fluid flowing through the turbine comprises compressed air provided by the reservoir and combustion product produced by burning fuel gas in the combustion chamber while the system is operating in the second operating mode; the working fluid flowing through the turbine comprises compressed air provided by the reservoir, compressed air provided by the compressor, and combustion product produced by burning fuel gas in the combustion chamber while the system is operating in the third operating mode; and the working fluid flowing through the turbine comprises compressed air provided by the compressor and combustion product produced by burning fuel gas in the combustion chamber while the system is operating in the fourth operating mode. In embodiments, the system is operated in the first operating mode while a pressure of the compressed air in the reservoir is greater than or equal to a first pressure value; the system is operated in the second operating mode while a pressure of the compressed air in the reservoir is less than the first pressure value and greater than or equal to a second pressure value; the system is operated in the third operating mode while a pressure of the compressed air in the reservoir is less than the second pressure value and greater than or equal to a third pressure value; and the system is operated in the fourth operating mode while a pressure of the compressed air in the reservoir is less than the third pressure value. In embodiments, the first pressure value is greater than the second pressure value and the second pressure value is greater than the third pressure value. In embodiments, the first pressure value is about 40 psi, the second pressure value is about 28 psi and the third pressure value is about 25 psi. In embodiments, the first pressure value is greater than 39 psi and less than 41 psi, the second pressure value is greater than 27 psi and less than 29 psi, and the third pressure value is greater than 24 psi and less than 26 psi.

The following United States patents are hereby incorporated by reference herein: U.S. Pat. Nos. 1,771,200, 3,631, 673, 3,643,426, 3,677,008, 3,831,373, 3,866,058, 3,885,163, 3,939,356, 3,988,897, 4,081,224, 4,100,745, 4,117,343, 4,147,204, 4,150,547, 4,158,145, 4,173,431, 4,237,692, 4,281,256, 4,312,179, 4,353,214, 4,409,489, 4,418,542, 4,523,432, 4,593,202, 4,686,822, 4,765,142, 4,819,423, 4,849,648, 4,916,893, 5,363,642, 5,448,889, 5,491,969, 5,537,822, 5,634,340, 5,845,479, 6,091,159, 6,172,426, 6,182,378, 6,376,925, 6,718,760, 6,745,569, 6,949,840, 7,086,231, 7,406,828, 7,669,423, 7,956,476, 8,253,281, 8,278,800, 8,341,964, 8,572,972, 9,157,421, 9,249,728, 9,322,296, 9,803,554, 9,784,186, 9,739,204, 9,464,575 and 9,140,193.

The above references in all sections of this application are herein incorporated by references in their entirety for all purposes. Components illustrated in such patents may be utilized with embodiments herein.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A method for generating electricity comprising:
    providing a system comprising:
        a turbine comprising turbine blades, the turbine being configured so that the turbine blades rotate when working fluid is flowing through the turbine;
        a generator coupled to the turbine by a generator shaft so that an armature of the generator rotates when the turbine blades of the turbine are rotating, wherein rotation of the armature produces electricity;
        a compressor selectively coupled to the turbine by a compressor drive assembly, the compressor drive assembly comprising a first drive shaft, a second drive shaft, and a clutch coupled between the first drive shaft and the second drive shaft, an outlet of the compressor being fluidly coupled to the turbine by a plurality of compressor feed valves;
        a reservoir containing compressed air, the reservoir fluidly communicating with the turbine via a combustion chamber and a plurality of reservoir feed valves;
        a pressure sensor capable of providing a stream of signals corresponding to a pressure of the compressed air in the reservoir, the pressure sensor being disposed in fluid communication with the reservoir; and
        a fuel valve coupled between the combustion chamber and a supply of fuel gas;
    the method further comprising:
        determining the pressure of the compressed air in the reservoir based on the stream of signals from the pressure sensor;
        disengaging the clutch, closing the plurality of compressor feed valves, opening the plurality of reservoir feed valves and closing the fuel valve while the pressure of the compressed air in the reservoir is greater than or equal to a first pressure value;
        disengaging the clutch, closing the plurality of compressor feed valves, opening the plurality of reservoir feed valves and opening the fuel valve while the pressure of the compressed air in the reservoir is less than the first pressure value and greater than or equal to a second pressure value;
        engaging the clutch, opening the plurality of compressor feed valves, opening the plurality of reservoir feed valves and opening the fuel valve while the pressure of the compressed air in the reservoir is less than the second pressure value and greater than or equal to a third pressure value; and
        engaging the clutch, opening the plurality of compressor feed valves, closing the plurality of reservoir feed valves and opening the fuel valve while the pressure of the compressed air in the reservoir is less than the third pressure value.

2. The method of claim 1, wherein the first pressure value is greater than the second pressure value and the second pressure value is greater than the third pressure value.

3. The method of claim 1, wherein the first pressure value is 40 psi, the second pressure value is 28 psi and the third pressure value is 25 psi.

4. A system for generating electricity comprising:
    a turbine comprising turbine blades, the turbine being configured so that the turbine blades rotate when working fluid is flowing through the turbine;
    a generator coupled to the turbine by a generator shaft so that an armature of the generator rotates when the turbine blades of the turbine are rotating, wherein rotation of the armature produces electricity;
    a compressor selectively coupled to the turbine by a compressor drive assembly, the compressor drive assembly comprising a first drive shaft, a second drive shaft, and a clutch coupled between the first drive shaft and the second drive shaft, an outlet of the compressor being fluidly coupled to the turbine by a plurality of compressor feed valves;
    a reservoir containing compressed air, the reservoir fluidly communicating with the turbine via a combustion chamber and a plurality of reservoir feed valves;
    a pressure sensor capable of providing a stream of signals corresponding to a pressure of the compressed air in the reservoir, the pressure sensor being disposed in fluid communication with the reservoir;

a fuel valve coupled between the combustion chamber and a supply of fuel gas; and circuitry operatively coupled to the pressure sensor, the clutch, the plurality of compressor feed valves, the plurality of reservoir feed valves, and the fuel valve, wherein the circuitry comprises one or more processors and a non-transitory computer readable medium storing one or more instruction sets, wherein the one or more instruction sets include instructions configured to be executed by the one or more processors to cause the system to:

determine the pressure of the compressed air in the reservoir based on the stream of signals from the pressure sensor;

disengage the clutch, close the plurality of compressor feed valves, open the plurality of reservoir feed valves, and close the fuel valve while the system is operating in a first operating mode;

disengage the clutch, close the plurality of compressor feed valves, open the plurality of reservoir feed valves, and open the fuel valve while the system is operating in a second operating mode;

engage the clutch, open the plurality of compressor feed valves, open the plurality of reservoir feed valves, and open the fuel valve while the system is operating in a third operating mode; and engage the clutch, open the plurality of compressor feed valves, close the plurality of reservoir feed valves, and open the fuel valve while the system is operating in a fourth operating mode.

5. The system of claim 4, wherein the non-transitory computer readable medium further stores one or more instruction sets configured to be executed by the one or more processors to cause the system to:

determine the pressure of the compressed air in the reservoir based on the stream of signals from the pressure sensor;

operate in the first operating mode while the pressure of the compressed air in the reservoir is greater than or equal to 40 psi;

operate in the second operating mode while the pressure of the compressed air in the reservoir is less than 40 psi and greater than or equal to 28 psi;

operate in the third operating mode while the pressure of the compressed air in the reservoir is less than 28 psi and greater than or equal to 25 psi; and operate in the fourth operating mode while the pressure of the compressed air in the reservoir is less than 25 psi.

6. The system of claim 4, wherein the compressed air provided to the turbine by the reservoir is not heated while no fuel gas is burned in the combustion chamber.

7. The system of claim 4, wherein the compressed air provided to the turbine by the reservoir is not heated while the system is operating in the first operating mode.

8. The system of claim 4, further comprising an ignition plug having a distal end disposed inside the combustion chamber, the ignition plug being capable of igniting fuel gas in the combustion chamber.

9. The system of claim 4, further comprising a pumping mechanism fluidly coupled to the reservoir, the pumping mechanism being capable of pumping gas into the reservoir.

10. A system for generating electricity comprising:

a turbine comprising a plurality of turbine blades, the turbine being configured so that the turbine blades rotate when working fluid is flowing through the turbine;

a generator coupled to the turbine by a generator shaft so that an armature of the generator rotates when the turbine blades of the turbine are rotating, wherein rotation of the armature produces electricity;

a compressor selectively coupled to the turbine by a compressor drive assembly, the compressor drive assembly comprising a first drive shaft, a second drive shaft, and a clutch coupled between the first drive shaft and the second drive shaft, an outlet of the compressor being fluidly coupled to the turbine by a plurality of compressor feed valves;

a reservoir containing compressed air, the reservoir fluidly communicating with the turbine via a combustion chamber and a plurality of reservoir feed valves;

a fuel valve coupled between the combustion chamber and a supply of fuel gas; and circuitry operatively coupled to the clutch, the plurality of compressor feed valves, the plurality of reservoir feed valves, and the fuel valve, wherein the circuitry comprises one or more processors and a non-transitory computer readable medium storing one or more instruction sets, wherein the one or more instruction sets include instructions configured to be executed by the one or more processors to cause the system to:

disengage the clutch, close the plurality of compressor feed valves, open the plurality of reservoir feed valves, and close the fuel valve while the system is operating in a first operating mode, wherein during operation in the first operating mode, the working fluid flowing through the turbine comprises compressed air provided by the reservoir and no fuel gas is burned in the combustion chamber;

disengage the clutch, close the plurality of compressor feed valves, open the plurality of reservoir feed valves, and open the fuel valve while the system is operating in a second operating mode, wherein during operation in the second operating mode, the working fluid flowing through the turbine comprises compressed air provided by the reservoir and combustion product produced by burning fuel gas in the combustion chamber;

engage the clutch, open the plurality of compressor feed valves, open the plurality of reservoir feed valves, and open the fuel valve while the system is operating in a third operating mode, wherein during operation in the third operating mode, the working fluid flowing through the turbine comprises compressed air provided by the reservoir, compressed air provided by the compressor, and combustion product produced by burning fuel gas in the combustion chamber; and engage the clutch, open the plurality of compressor feed valves, close the plurality of reservoir feed valves, and open the fuel valve while the system is operating in a fourth operating mode, wherein during operation in the fourth operating mode, the working fluid flowing through the turbine comprises compressed air provided by the compressor and combustion product produced by burning fuel gas in the combustion chamber.

11. The system of claim 10, wherein:
the system is operated in the first operating mode while a pressure of the compressed air in the reservoir is greater than or equal to a first pressure value;
the system is operated in the second operating mode while the pressure of the compressed air in the reservoir is less than the first pressure value and greater than or equal to a second pressure value;
the system is operated in the third operating mode while the pressure of the compressed air in the reservoir is less than the second pressure value and greater than or equal to a third pressure value;
the system is operated in the fourth operating mode while the pressure of the compressed air in the reservoir is less than the third pressure value;
wherein the first pressure value is greater than the second pressure value and the second pressure value is greater than the third pressure value.

12. The system of claim 1, wherein: the first pressure value is 40 psi, the second pressure value is 28 psi, and the third pressure value is 25 psi.

13. The system of claim 10, further comprising a pressure sensor capable of providing a stream of signals corresponding to a pressure of the compressed air in the reservoir, the pressure sensor being disposed in fluid communication with the reservoir, wherein the circuitry is operatively-coupled to the pressure sensor, wherein the non-transitory computer readable medium further stores one or more instruction sets configured to be executed by the one or more processors to cause the system to:
determine the pressure of the compressed air in the reservoir based on the stream of signals from the pressure sensor;
operate the system in the first operating mode while the pressure of the compressed air in the reservoir is greater than or equal to a first pressure value;
operate the system in the second operating mode while the pressure of the compressed air in the reservoir is less than the first pressure value and greater than or equal to a second pressure value;
operate the system in the third operating mode while the pressure of the compressed air in the reservoir is less than the second pressure value and greater than or equal to a third pressure value;
operate the system in the fourth operating mode while the pressure of the compressed air in the reservoir is less than the third pressure value;
wherein the first pressure value is greater than the second pressure value and the second pressure value is greater than the third pressure value.

14. The system of claim 10, further comprising a pressure sensor capable of providing a stream of signals corresponding to a pressure of the compressed air in the reservoir, the pressure sensor being disposed in fluid communication with the reservoir, wherein the circuitry is operatively-coupled to the pressure sensor, wherein the non-transitory computer readable medium further stores one or more instruction sets configured to be executed by the one or more processors to cause the system to:
determine the pressure of the compressed air in the reservoir based on the stream of signals from the pressure sensor;
operate the system in the first operating mode while the pressure of the compressed air in the reservoir is greater than or equal to 40 psi;
operate the system in the second operating mode while the pressure of the compressed air in the reservoir is less than 40 psi and greater than or equal to 28 psi;
operate the system in the third operating mode while the pressure of the compressed air in the reservoir is less than 28 psi and greater than or equal to 25 psi;
operate the system in the fourth operating mode while the pressure of the compressed air in the reservoir is less than 25 psi.

15. The system of claim 10, wherein the compressed air provided to the turbine by the reservoir is not heated while no fuel gas is burned in the combustion chamber.

16. The system of claim 10, wherein the compressed air provided to the turbine by the reservoir is not heated while the system is operating in the first operating mode.

17. The system of claim 10, further comprising an ignition plug having a distal end disposed inside the combustion chamber, the ignition plug being capable of igniting fuel gas in the combustion chamber.

18. The system of claim 10, further comprising a pumping mechanism fluidly coupled to the reservoir, the pumping mechanism being capable of pumping gas into the reservoir.

* * * * *